(12) United States Patent
Lewis et al.

(10) Patent No.: US 12,174,708 B2
(45) Date of Patent: *Dec. 24, 2024

(54) TARGETED DEDUPLICATION USING SERVER GENERATED GROUP FINGERPRINTS FOR VIRTUAL SYNTHESIS

(71) Applicant: Dell Products L.P., Round Rock, TX (US)

(72) Inventors: Donna Barry Lewis, Holly Springs, NC (US); Salil Dangi, Mission Viejo, CA (US); Gokul Prasanna Mani, Apex, NC (US)

(73) Assignee: Dell Products L.P., Hopkinton, MA (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/873,769

(22) Filed: Jul. 26, 2022

(65) Prior Publication Data

US 2024/0036979 A1 Feb. 1, 2024

(51) Int. Cl.
*G06F 11/14* (2006.01)

(52) U.S. Cl.
CPC ...... *G06F 11/1453* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,398,016 B1 | 7/2016 | Chakraborty | |
| 10,346,256 B1 * | 7/2019 | Levin-Michael | H04L 9/3239 |
| 2020/0019514 A1 * | 1/2020 | Desai | G06F 12/123 |
| 2023/0114100 A1 * | 4/2023 | Madan | G06F 9/3802 |
| | | | 711/162 |
| 2023/0376385 A1 * | 11/2023 | Bhanjois | G06F 11/1464 |

* cited by examiner

*Primary Examiner* — Belix M Ortiz Ditren
(74) *Attorney, Agent, or Firm* — Staniford Tomita LLP

(57) ABSTRACT

Embodiments of a targeted deduplication process that splits protected data into variable size segments, generates a fingerprint for each segment, and then combines fingerprints into groups to form group fingerprints. An embodiment auto-generates and persists the group fingerprints for the backups which are already on the storage server, thus enabling the backup client to fetch these fingerprints using an identifier and enforce synthesis for the new backup or replication copy against any previously written backup. For this embodiment, group fingerprints are generated on the storage server itself, rather than being generated on and pushed from the backup client for mere storage on the storage server, so that, as files are ingested, the storage server also auto-generates group fingerprints on its own.

16 Claims, 10 Drawing Sheets

TARGETED DEDUPLICATION USING SERVER GENERATED GROUP FINGERPRINTS FOR VIRTUAL SYNTHESIS

CROSS-REFERENCE TO RELATED APPLICATIONS

This application is related to U.S. patent application Ser. No. 17/730,935 filed on Apr. 27, 2022 and entitled "Targeted Deduplication Using Server-Side Group Fingerprints For Virtual Synthesis," which is assigned to the assignee of the present application, and which is hereby incorporated by reference in its entirety.

TECHNICAL FIELD

Embodiments relate generally to deduplication storage systems, and more specifically to enabling client-side targeted deduplication using virtual synthesis.

BACKGROUND OF THE INVENTION

Data is typically backed up by copying the data from a data source (backup client) to a data target, such as a storage server or appliance. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

Different types of backups can be performed during the course of a regular backup schedule. A full backup copies all data from a source to a destination in a single backup session, while an incremental backup only copies data that has changed since a last backup, and a differential backup copies data that has changed since a last full backup. A synthetic backup is a full backup that is created by combining a previous full backup with subsequent incremental backups, and as such, requires less time to complete than a regular full backup.

Many present backup applications create virtual synthetic based backups by stitching together a current backup using previous backup data already stored on the storage appliance, as opposed to traditional deduplication where the logic segments, fingerprints, and filters all the data to be backed up. Creating a synthesized backup generally saves network bandwidth and can also enable enhanced replication and cyber recovery optimizations by capturing recipes of these synthesis operations. However, this type of backup requires applications to know what data has specifically changed from one backup to the next using techniques such as Change Block Tracking (CBT). As a result, many asset types (e.g., databases) that lack this knowledge cannot take advantage of virtual synthetic backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost (DDBoost) are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
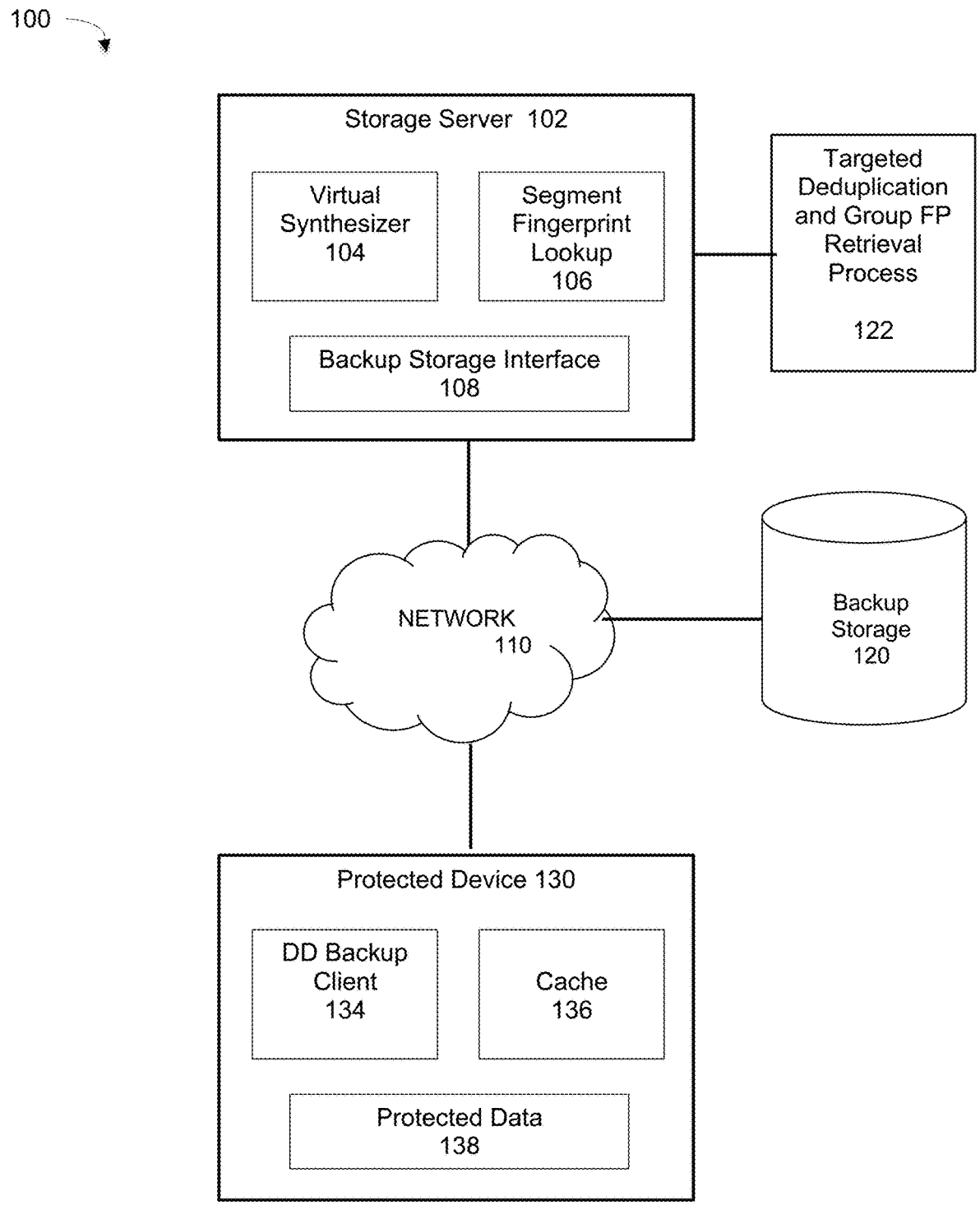
FIG. 1 illustrates a computer network system implementing a method for client-side targeted deduplication using virtual synthesis, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system that implements one or more embodiments of a data processing and storage network system implementing an enhanced method for client-side targeted deduplication using virtual synthesis, under some embodiments. System 100 includes processing component 122 that enables virtual synthetic backups for applications that do not have sufficient knowledge of what changes (e.g., changed blocks) were made from a previous backup to use the virtual synthetic operations on their own.

In the example system 100, deduplication backup storage server 102 communicates with a protected device or backup client 130 via network 110. Backup data from protected device 130 is stored in deduplication backup storage 120, which is coupled to and managed by storage server 102, either directly or through the network 110. Storage server 102 includes virtual synthesizer 104, segment fingerprint lookup 106, and backup storage interface 108. Protected device 130 includes deduplication backup client 134, protected data 138, and cache 136. For clarity, only a single backup storage device and a single protected device are shown, however many additional storage and protected devices may be used depending on the network scale and backup configuration.

In system 100, storage server 102 executes a data storage or backup management process that coordinates or manages the backup of data from one or more data sources (e.g., protected device 130) to storage devices, such as backup storage 120. This storage may be embodied as local storage, network storage, or virtual storage devices in which any number of virtual machines (VMs) or virtual centers may be provided to serve as backup targets. The data sourced by the data source may be any appropriate data, such as database data that is part of a database management system, and the data may reside on one or more hard drives for the database (s) in a variety of formats.

The server and client computers (e.g., protected device 130) are coupled directly or indirectly to each other and the storage through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. Such a system may provide support for various storage architectures such as storage area network (SAN), Network-attached Storage (NAS), or Direct-attached Storage (DAS) that make use of large-scale network accessible storage devices for storage 120. Data Domain is an example of a purpose-built backup appliance providing streaming deduplication that is able to ingest data at full network speeds, from multiple backup sources while providing storage efficiency.

The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A fingerprint is thus a compact representation of the actual data (or segment). The data (or segment) is passed through a SHA-1 (Secure Hash Function) cryptographic hash function to produce a hash value that comprises the fingerprint. Each unique data segment will generate a unique fingerprint (e.g., 20 bytes in size) and this fingerprint is used to index and get the actual data segment. Basically, the fingerprint is a compact representation of the actual data, and is used to deduplicate the data ingested into the file system.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
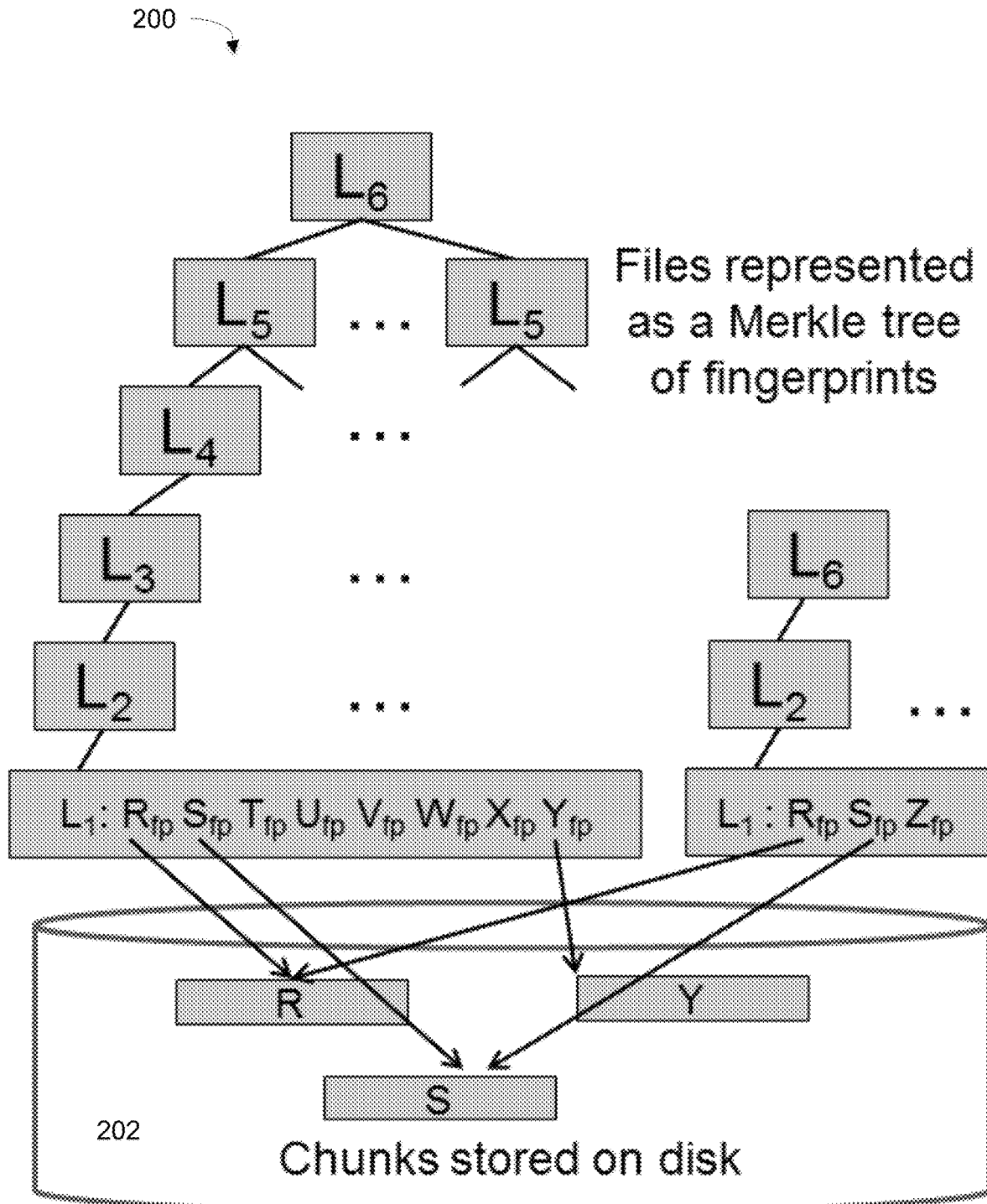
FIG. 2 illustrates an example Merkle tree representation of files in a deduplication backup system, under some embodiments.

FIG. 2 illustrates an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_2$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as Lp chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, Lp chunks are themselves stored on disk in containers, which include a relatively small (hundreds of KB) metadata section with a list of fingerprints for the chunks within the container. Thus, they may be read more quickly than the full container.

In a DDFS system, as data is ingested to the filesystem, the system anchors and segments the data. The fingerprints for the data are then computed using a hashing method. These fingerprints are looked up in a big hash table (index), and if the fingerprints do not exist, the segments would be compressed and encrypted and packed into compression regions. The compression regions are sandwiched in turn, into a data structure called the containers. A file is a logical list of fingerprints. When the file is read, the fingerprints are looked up, and the container and the compression region corresponding to the fingerprint are brought into memory, decrypted, de-compressed and read. The buffer is then returned to the upper layers of the filesystem, and finally to the application request.

Figure 3:
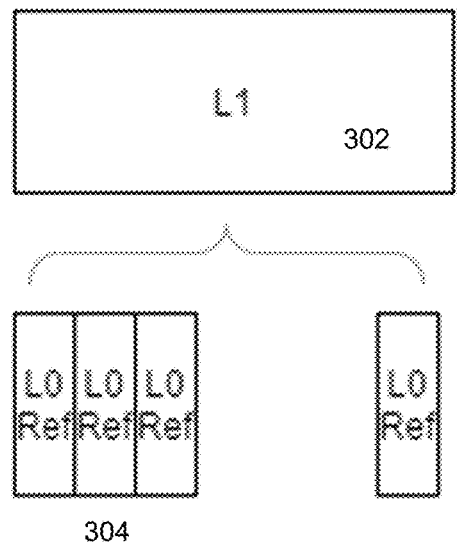
FIG. 3 illustrates an L1 segment referenced by multiple fingerprints (L0 references), in an example embodiment.

As shown in FIG. 2, the filesystem organizes the list of fingerprints associated with a file in a Merkle tree 200. This allows for easy access to a certain offset. The L1 segment is a list of L0 refs or fingerprints which are sandwiched together. Each L0 reference (fingerprint) points to data. This is illustrated in FIG. 3, which illustrates an L1 segment 302 referenced by multiple L0 refs 304, in an example embodiment.

Figure 4:
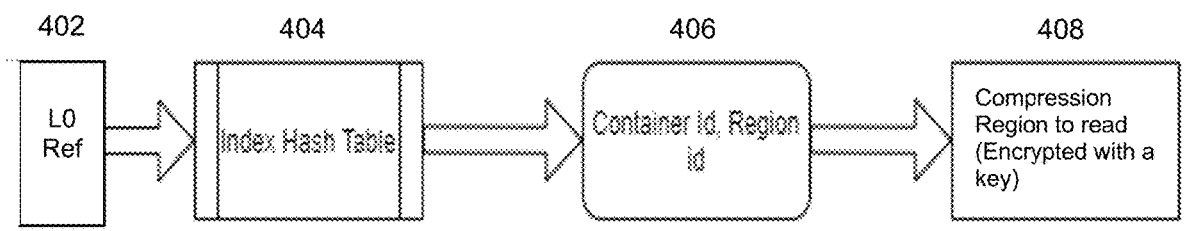
FIG. 4 illustrates an L0 reference accessing an index hash table that provides a container ID and region ID that accesses compression region, under some embodiments.

To access the data, the fingerprint must be looked up using the index, which would return the container ID and the region ID within the container. The compression region metadata holds the key ID, which is then used to read the encrypted key to decrypt the compression region. This is illustrated in FIG. 4, which illustrates an L0 ref 402 accessing an index hash table 404 that provides a container ID and region ID that accesses compression region 406.

In a deduplication backup system that comprises a backup client (protected device) and a storage server, such as shown in FIG. 1, the protected data 138 can be split into variable size segments. A fingerprint can be generated for each segment, and these fingerprints can then be grouped to form a group fingerprint.

In an embodiment, the backup system 100 uses the client-based persistent cache 136 to identify duplicate group fingerprints and create virtual copies when these duplicates are detected. For this embodiment, the group fingerprints used on the backup client to identify duplicate data are not persisted on the backup client 130 but are instead retrieved from the storage server 102 during the backup process on an "as needed" basis. The specific group fingerprints sent are based on knowledge of previous backups of the asset, either learned or provided as a hint from the backup application. Once it is known that a specific group fingerprint is present on the server, a virtual synthetic request can be generated instead of a traditional deduplication process. The hint represents a workflow insight that is gained through a working partnership between the client and server to leverage the hint to identify a good set of group fingerprints to use for comparison. Such a hint may generally consist of backup location information, such as filename and path or other identifying information about one or more previous backups.

In system 100, the segments, fingerprints and the group fingerprints are all stored in storage server 102. Embodiments of system 100 also include a group fingerprint (GFP) retrieval process that provides the ability to fetch the group fingerprints from the storage server based on workflow insights either provided by the application or that are learned. The backup client 130 can then perform inline deduplication based on the group fingerprints after fetching them from the storage server.

Figure 5:
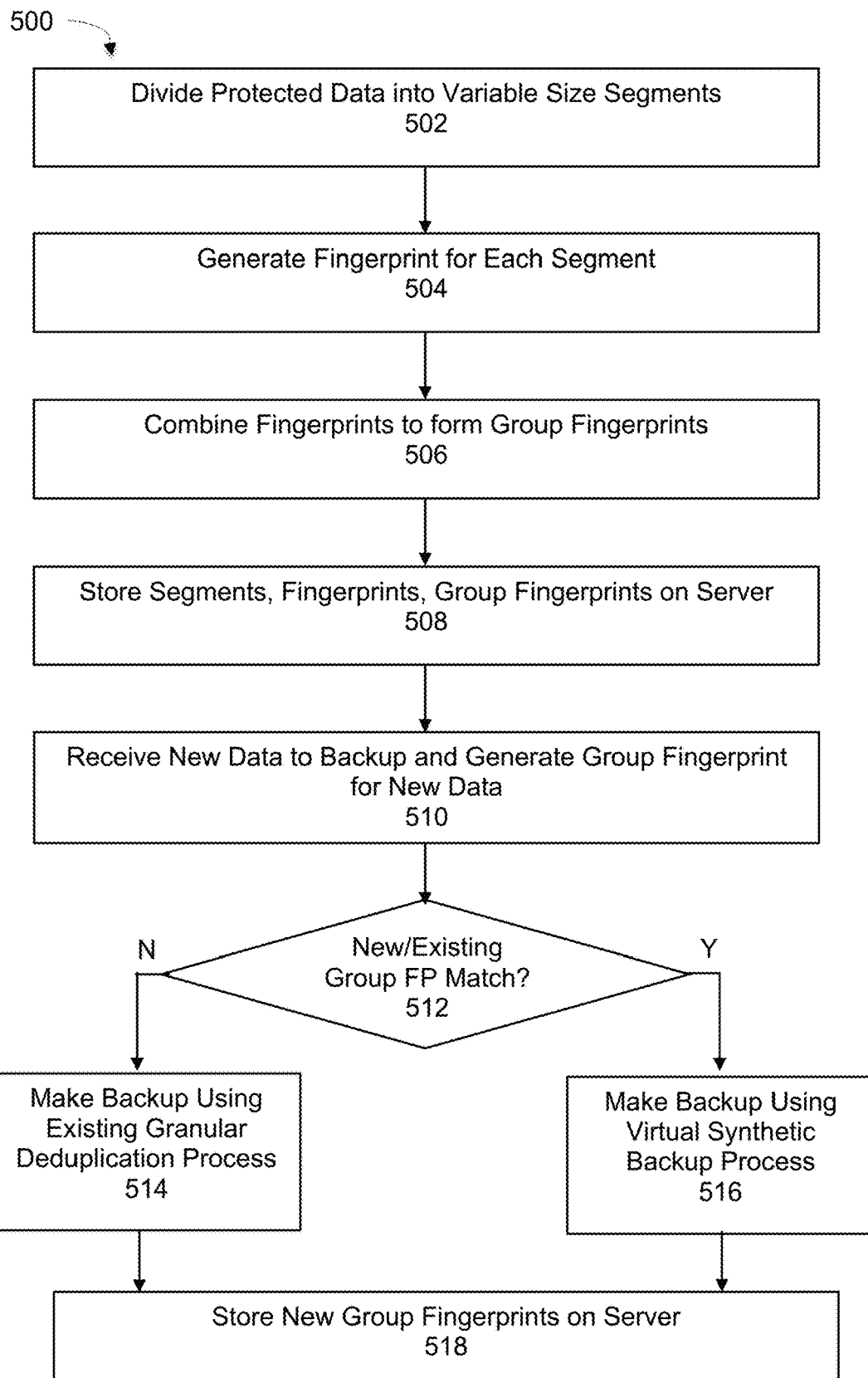
FIG. 5 is a flowchart illustrating an overall method of using a client-side cache for retrieving group fingerprints from a server for deduplication backups, under some embodiments.

FIG. 5 is a flowchart illustrating an overall method of using a client-side cache for retrieving group fingerprints from a server for deduplication backups, under some embodiments. Process 500 starts by dividing the protected data into variable size segments, 502, and generating a fingerprint for each segment, 504. These fingerprints are then combined into groups to form group fingerprints, 506

In these steps, the backup client segments the data to be protected into a plurality of segments, generates a fingerprint for each data segment (or 'segment') and a group fingerprint for a plurality of the fingerprints. The data segments, fingerprints, and group fingerprints are all stored on the storage server, 508.

In response to a backup operation for new data, the backup client compares the group fingerprint it generated for the new data against a list of group fingerprints which were fetched from the protection storage server based on a hint provided by the backup client, 510. It is next determined whether there is a match of these group fingerprints, 512. If a match is detected, this confirms the data corresponding to this group fingerprint is already present on the protection storage server, and this can be leveraged to make the new backup using a virtual synthetic request, 516. If contiguous group fingerprints of new data match, the virtual synthetic request can be combined as a single request. If there are no matches for the new group fingerprints, the process performs the more granular deduplication approach already in place which looks at each fingerprint per segment, 514. The newly generated group fingerprints are also stored in the storage server with an identifier for a previous backup for easy retrieval, 518.

In an embodiment, the backup client will also remember the last pulled group fingerprint offset to know from where to start pulling from next time. This process can also be extended to pull a preset amount of group fingerprints based on the memory resources available on the backup client.

With respect to step 502 of process 500, in some embodiments, an anchoring process already used by a backup client is used to divide the data into segments. For example, if the protected data comprises a file or database, then the anchoring process is used to divide the file or database into multiple segments. In the case of a single stream of data from a single file, a segment includes data from two different objects (e.g., data from a first file and a second file). In some embodiments, the segments generated at step 502 have variable lengths. That is, it is not necessary for the generated segments to have the same length.

For the fingerprint generation, 504, a fingerprint refers to a representative value of a segment which changes when the value of the segment changes. Stated another way, a fingerprint does not change so long as the value of the segment remains the same. In one example, a fingerprint is a hash of the segment. To ensure that the same segment value produces the same fingerprint again if the process repeated again later, in embodiments where a hash is used, the hash is not salted so that the same fingerprint can be repeatedly generated for the same segment value. In some embodiments, a hash already being used by a backup client is used to generate the fingerprint.

As shown in 506, the plurality of fingerprints is grouped into one or more groups of fingerprints. In some embodiments, an anchoring process is used to perform this grouping. In some embodiments, this is a different anchoring process as used in step 502. For example, in some applications it may be desirable to have two anchoring processes that can be tuned independently for different performance goals and/or system characteristics. For example, whereas it is acceptable at step 502 to divide the protected data at any byte, at step 506 the boundaries or divisions should only occur at fingerprint boundaries as opposed to any byte.

In some embodiments, the configurations or settings of an anchoring process (e.g., that control the size of an average or nominal group of fingerprints at step 506) are set based on one or more system or environmental inputs. For example, depending upon the amount of memory allocated for the cache, the amount of protected data, and/or a desired cache hit rate, the size of a group of fingerprints will tend to be larger or smaller. In some embodiments, such environmental or system inputs are obtained when a deduplication backup system is installed. It is noted that once the configurations or settings of an anchoring process are set (e.g., based on available memory, etc.), those configurations are not changed to ensure consistency between backups and avoid unnecessary cache misses.

In step 506 a group fingerprint is generated by combining the segment fingerprints. In some embodiments, a hash is used and the hash may or may not be the same hash as one used at step 504. Like individual segment fingerprints, group fingerprints remain the same so long as the group of fingerprints does not change. If, however, one or more of the fingerprints in the group change, then the value of the group fingerprint changes.

For process 500, steps 502 to 506 may be implemented as a pipeline, that is, they may operate simultaneously on data at different stages in the process.

Process 500 also involves determining if the group fingerprint being processed is stored in a cache. This cache is sometimes referred to herein as a client-side cache or as a cache on a protected device (e.g., for those embodiments where a backup client is running on a protected device). If the process is being performed by a proxy device then the cache may be on the proxy device and not the protected device. If the group fingerprint being processed is stored in the cache, then the group fingerprint being processed is flagged as one for which a virtual copy will be performed.

For purposes of description, a virtual copy is a copy process in which data is not copied from a protected device to a deduplication storage server (e.g., over a network), but is rather identified as data that has already been backed up during a previous backup, for example by identifying that earlier backup, some offset from the beginning of that earlier backup, and a length starting from that offset. Using a virtual copy is faster than transferring the protected data over the network from the protected device to backup storage, so identifying duplicate data and performing virtual copies is desirable.

In general, virtual copies are made only for data of group fingerprints that are stored in the cache. For example, a backup client running on a protected device may send a virtual copy instruction to a deduplication storage server that identifies a data range in the current backup (e.g., identified by an offset and a length from that offset), the previous backup which includes the identical data, and a data range within that previous backup (e.g., identified by an offset and a length from that offset).

In some embodiments, the process can include consolidating two or more group fingerprints (all of which are stored in the cache and all of which are sequential or adjacent to one another such that they can be referenced using a single previous backup, a single offset, and a single length) into a single virtual copy command. Consolidating multiple group fingerprints that are stored in the cache into a single virtual copy command is more efficient, for example, than having multiple virtual copy commands, each of which refers to a smaller amount of data.

As shown in FIG. 5, embodiments of process 500 use group fingerprints in a targeted deduplication method in which the server stores group fingerprints that are retrieved as needed as part of the backup process. In this manner, group fingerprints that are used for filtering are not populated and persisted in the client-side cache. This improved process, thus removes the need to persist group fingerprints on the backup client during backup, and it removes the need to verify that the group fingerprints stored on the backup client are still present and valid on the server, as well as the need for backup client disk space to persist the group fingerprint cache.

There may be cases where subsequent backups after the first full backup are not performed by the same client machine (e.g., in a proxy environment, like Hadoop). If the system only caches the group fingerprints on the backup client, it can potentially lose the ability to do the targeted deduplication on the following backup. In contrast, persisting the group fingerprints on the storage server itself, rather than the backup client enables this. There may be a cost imposed for saving the group fingerprints on the storage server, but this is easily offset by the reduced cost for the representation of L0 FP chain when part of the backups are converted to virtual synthetic backups.

Figure 6:
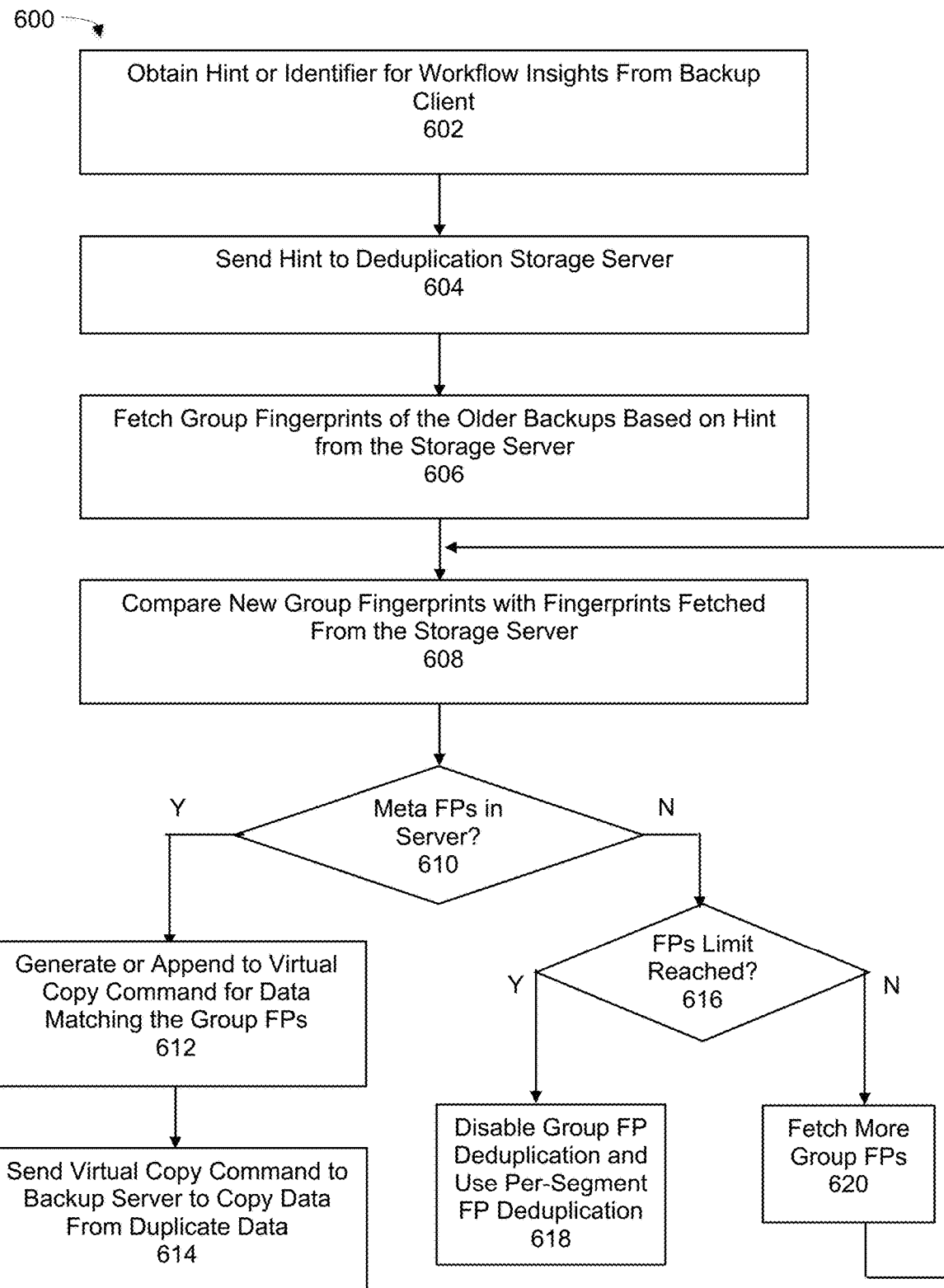
FIG. 6 is a flowchart that illustrates a method of performing targeted deduplication using server-side group fingerprints, under some embodiments.

FIG. 6 is a flowchart that illustrates a method of performing targeted deduplication using server-side group fingerprints, under some embodiments. Process 600 of FIG. 6 starts with obtaining a hint or identifier for workflow insights from the backup client, 602. A hint may be a filename (/path/filename.xxx) of a previous backup of the same asset, a directory name where the previous backups reside, the hostname of the storage server, or any other similar location or identification of a previous backup involving the file.

These hints are then sent to the deduplication storage server, 604. Based on these hints, group fingerprints of older backups are fetched from the server, 606. Upon receipt of new group fingerprints for a new backup operation, the process compares the new group fingerprints with the group fingerprints fetched from the server, 608.

In decision step 610, it is determined whether or not the new FPs (fingerprint metadata) are present in the server. If so, the process generates or appends to the virtual copy command for the data matching the group fingerprints, 612. With respect to this appending step, The virtual copy command represents a contiguous set of data that can be synthesized from a file already on the system. If the FP is identified as a duplicate and a virtual synthetic command is already being created based on the previous data also being duplicated, it will append to this command. That is, it will extend the length in the virtual copy command to include this additional section of data as well. The virtual copy command is then sent to the storage server to virtually copy the existing data, that is data that is already present in storage, 614.

If, in step 610, it is determined that there is no match between the new group fingerprints and the fetched (old) fingerprints, the process next determines whether or not a defined limit for fetching new fingerprints has been reached, 616. If not, more fingerprints are fetched for comparison until such a limit is reached, 620. If the fingerprint limit is reached, the process disables the group fingerprint deduplication and uses a traditional per-segment fingerprint based deduplication backup, 618.

In the traditional deduplication workflow, 618 all fingerprints are sent to the backup appliance for filtering, whereas in the targeted deduplication case, 614, only the group fingerprints are retrieved and used for the filtering. Only data associated with those group fingerprints that are not known to the system need to be transferred using the traditional deduplication method, as shown in the sequence of decisions leading to step 618 versus step 614.

At the conclusion of the targeted deduplication backup case, a backup recipe is available made up of the virtual copy commands along with the offset and length of new data written. This recipe can be used to optimize replication (e.g., using a virtual synthetic restore feature) and supports the cyber recovery capability of only identifying and scanning newly written data.

Figure 7:
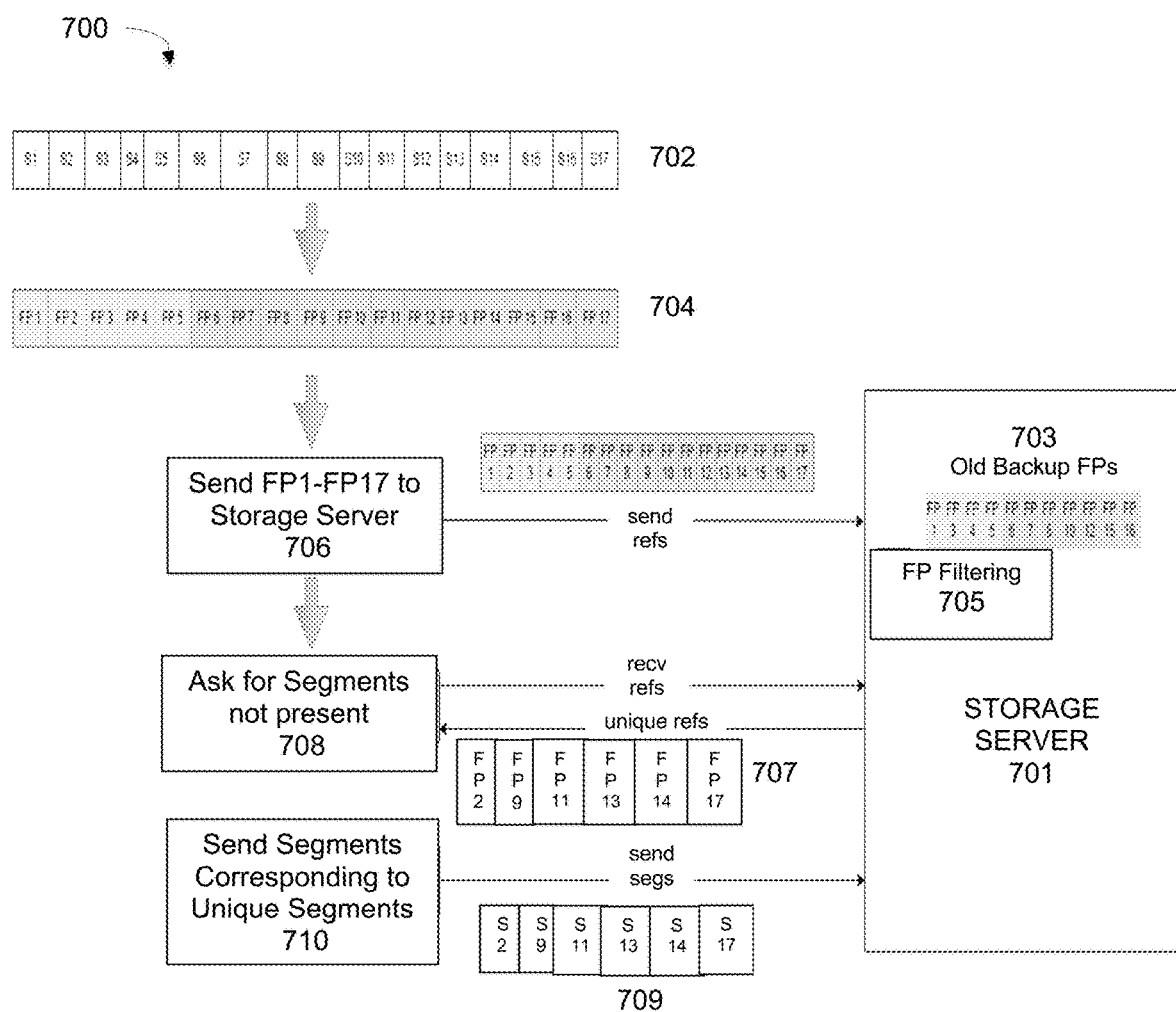
FIG. 7 is a diagram that illustrates a per-segment deduplication backup process, under some embodiments.

FIG. 7 is a diagram that illustrates a per-segment deduplication backup process, under some embodiments. As shown in diagram 700, a number (17) of segments 702, denoted S1 to S17, are provided for backup by storage server 701. A corresponding fingerprint (FP) 704 is generated for each segment resulting in 17 fingerprints (FP1 to FP17) as shown for this example. These fingerprints are then sent to the storage server 701 by process 706. The storage server 703 contains some fingerprints from one or more previous backups, and then fingerprint filtering component 705 compares the new fingerprints 704 to these old backup fingerprints 703. This filtering process results in a list of missing fingerprints, which identify segments not present for step 708. In this example, FPs 2, 9, 11, 13, 14, and 17 are not matched between new set 704 (FP1 to FP17 inclusive) and old FP set 703 (FP1, 3-8, 10, 12, 15-16).

The storage server 701 then indicates that the unique references corresponding to the missing fingerprints 707 are needed. The backup client then sends the segments corresponding to the unique fingerprints 707 identified as not matching, in step 710. For this example, the corresponding segments 709 are S2, S9, S11, S13, S14, and S17. These segments are then copied by the present backup operation, while the segments corresponding to the matching fingerprints are not stored, as this data already exists on the storage server 701. For the backup processing described herein, the system or computer sending the backup data represents a client system, and thus, in FIG. 7, processes 706, 708, and 710 are performed by a backup client.

In an embodiment, this process 700 is the normal per-segment deduplication process performed in step 618 of FIG. 6. Embodiments of the group fingerprint retrieval process 122 of system 100 enhance this deduplication process by adding certain group fingerprint (GFP) process steps.

Figure 8:
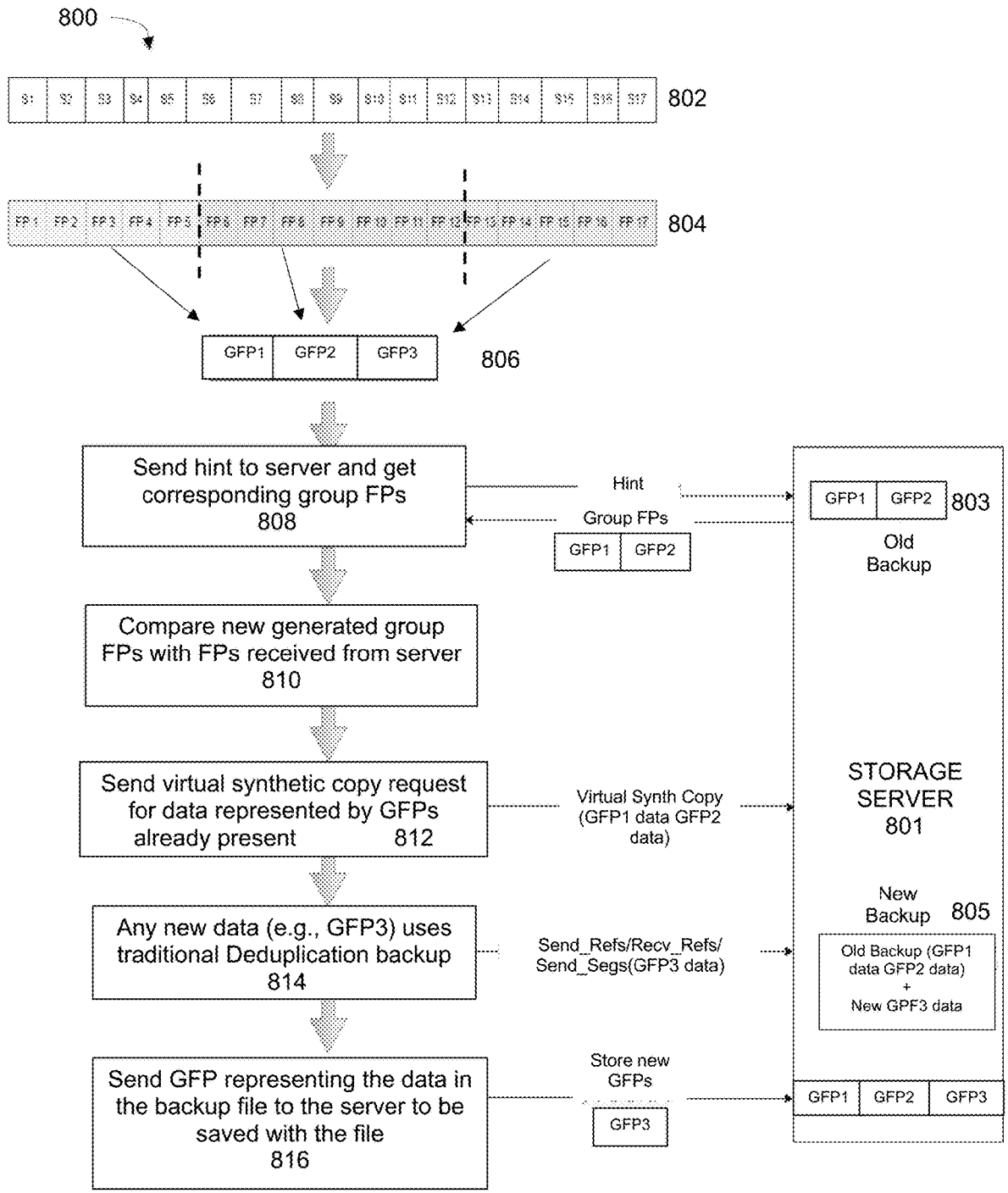
FIG. 8 is a diagram that illustrates a targeted deduplication backup process using server-side group fingerprints, under some embodiments.

FIG. 8 is a diagram that illustrates a targeted deduplication backup process using server-side group fingerprints, under some embodiments. As shown in diagram 800, a number (17) of segments 802, denoted S1 to S17, are provided for backup by storage server 801. A corresponding fingerprint (FP) 804 is generated for each segment resulting in 17 fingerprints (FP1 to FP17) as shown for this example. These fingerprints are then grouped into respective groups 806. For the example shown the 17 fingerprints are divided into three similarly-sized groups of fingerprints each, resulting in group fingerprints 1, 2, and 3, denoted GFP1, GFP2, and GFP3, as shown. The grouping can be done in any appropriate manner and can result in equal or unequal size groups.

In step 808, the backup client sends the workflow insight (hint) to the storage server 801 and receives back corresponding group fingerprints for an old backup, 803. For this example, the group fingerprints are GFP1 and GFP2. For this example, it is assumed that the storage server 801 contains some fingerprints from one or more previous backups that have been grouped, and the backup client compares new fingerprint groups 806 to these old backup group fingerprints 803 that were received back from the server, step 810. This comparison results in a list of matching fingerprint groups (e.g., GFP1 and GFP2), which identify segments already stored in the storage server for the present backup set. The backup client then sends a virtual synthetic copy request for data represented by group fingerprints as already present in the server, step 812. Any group fingerprints not matching represent new segments that were not previously stored. Any such new data, in this case segments for GFP3) are backed up to storage server 801 using traditional per-segment backups, such as process 700 of FIG. 7, step 814. The fingerprints and segments for the new data are sent to the storage server, which then performs a new backup operation 805, which combines the old backup data segments (e.g., corresponding to GFP1, GFP2) with the new data segments (e.g., corresponding to GFP3). The new data segment group fingerprints (GFP3) are then stored in the storage server for use as the 'old' backup data for the next backup cycle. Step 816 thus comprises sending the GFP representing the data in the backup file to the storage server to be saved along with the file itself.

At the time of replication, if the backup file was generated using a specific sequence of steps referred to as a 'recipe,' the replication logic will attempt to replay it to generate the same backup file on the target. Thus, an old backup combination that is combined with the new backup data comprises a 'recipe' that is created.

For the example of FIG. 8, the segments corresponding to GFP1 and GFP2, which were present in the old backup 803 are the recipe for the current backup adding GFP2. Thus the recipe in this example case corresponds to:

> Current Backup=(Old Backup: offset region represented by *GFP*1 and *GFP*2)+(data represented by *GFP*3).

In this simple example, assume Old_Backup was already on the target system, so to create the new backup file on the target, the replication code would simply issue a synthesis operation to synthesize the data represented by GFP1 and GFP2 of the Old_Backup to the new file, and then send the data associated with GFP3. Thus illustrating the use of the recipe in this case.

Embodiments of the targeted deduplication process retrieve the relevant group fingerprints from the protection storage server using a hint instead of maintaining them in a cache on the backup client. These group fingerprints can be fetched based on a client identifier which can be a backup client name or IP, the previous backup from the same backup client, or a specific hint given to the backup client by the backup application. A separate application program interface (API) to get these group fingerprints can be used and this can allow the storage server to get more group fingerprints as needed. Such a solution is ideal for environments where the bulk of the deduplication logic resides on the storage server and the fingerprint metadata is accessible from a high throughput store. This method improves on persistent client-side cache approaches in that this method does not require the system remembering previous backup's group fingerprints in the cache (limited by size) and can fetch the relevant group fingerprints from the storage server instead.

The targeted deduplication process 800 can apply virtual synthetics to many backups or applications protecting any type of data. It does not require application intelligence to drive the synthesis. It also allows the process of finding what segments are new to be shifted from the deduplication storage server to the backup client freeing up compute resources on the server, without the need of a client-side cache. Since synthetics is used there is the potential for metadata storage savings. The process further enables the benefits of targeted deduplication to be realized in proxy environments as the client cache is not required. The process also saves network bandwidth and the performance overhead of polling for filtering results. It also enables the creation of backup recipes, and in turn enables features that make use of these recipes (e.g., virtual synthetic replication, and cyber recovery diffing method to identify only new data written for the purposes of security scanning).

In an embodiment, the deduplication backup process executed by a data storage server running a Data Domain file system (DDFS) and including a Data Domain Bandwidth Optimized Open Storage Technology (DDBoost) library that links with the application to reduce bandwidth required for data ingests, and which translates application read and write request to DDBoost application program interfaces (APIs).

For this embodiment, the targeted deduplication process provides the ability for deduplication management to be performed within the client-side DDBoost stack without the DDBoost needing access to the backup client's disk.

As stated above, embodiments of the targeted deduplication process generally saves network bandwidth over present methods, but there may be some added overhead in server storage. Generally this a trade-off as the group fingerprints generated by the backup client are stored in the storage server, which needs some storage space. For example if for a terabyte of gen0 data to be backed up, it will need the following amount of storage for storing the group fingerprints: if there is a group fingerprint to span 256 KB of data (meaning a group fingerprint covering about 32 L0 segments of average size 8 KB), then the system would need four group fingerprints to cover 1 MB of data; so for 1 TB, it would need 1024*1024*4=4M group fingerprints. Considering each group fingerprint has a size of 40 bytes, this would need 160 MB of storage space to cover for a 1 TB file which is 0.015% of the total data that was backed up.

It should be noted that, for storage efficiency the group fingerprints can be removed as files age and only remain on the most recent backups. Assuming that it is possible to deduplicate 25% of a first generation (gen1) backup using these group fingerprints and targeted deduplication and convert them to synthetic writes, it is not necessary to send the corresponding L0 fingerprint traffic over the network as with traditional deduplication. Therefore, the network bandwidth savings is obtained for a fraction of the storage costs. Assuming 24 byte L0 fingerprints and an average 8 KB L0 span, the system will need 250*1024*128*24=750 MB of L0 data transferred across the wire (for 25% or 250 GB of a 1 TB backup). For one Petabyte (PB) of data, it would need 4G (4*1024*1024*1024) group fingerprints which is 160 GB of storage space on the storage server. Again, roughly assuming a 25% conversion rate of traditional deduplication into virtual synthetics, the system can save network bandwidth by eliminating the need to send 750 GB of L0 metadata over the network.

Through the embodiment described above with respect to FIG. 8, GFPs are now stored on the storage server instead of in the backup client cache. The GFPs calculated on the backup client are sent to the storage server for storage as part of the targeted-deduplication process. In this case, the storage server simply stores the GFPs, it does not manage the lifecycle of the GFPs.

Server Generated Group Fingerprints

Generating backups using synthesis, where the backup is formed by reusing the unchanged chunks from older generations, has advantages in terms of network bandwidth savings resulting from not needing to resend all the segments. It also saves critical compute resources by freeing them up from needing to segment and fingerprint all the data again. The synthetic workflow is also used when replicating a backup copy to another storage server. The use of group fingerprints to achieve synthesis as described above allows many backup types that cannot track the changed chunks between backups to also benefit from synthetic backups.

Embodiments described above are directed at using group fingerprints to create virtual-synthetic backups. Such group fingerprints are generated on the backup client and stored on the storage server and reference the backup client that has generated them to benefit all backup environments (proxy, etc.).

An alternative embodiment provides a system that auto-generates and persists the group fingerprints for the backups which are already on the storage server, thus enabling the backup client to fetch these fingerprints using an identifier and enforce synthesis for the new backup or replication copy against any previously written backup.

In this alternative embodiment, the group fingerprints are generated on the storage server itself, rather than being generated on and pushed from the backup client for mere storage on the storage server. Thus, rather than have group fingerprints merely stored on the storage server, as files are ingested, the storage server also auto-generates group fingerprints on its own.

The group fingerprints can be generated inline as and when it accumulates the required number of L0 fingerprints. All of these group fingerprints can then be stored along with the segment tree for that file, where the fingerprint segment tree of a file can be enumerated using the same logic used for garbage collection.

The formation of these group fingerprints for files already present on the storage server can be done during the idle time of the storage server, or it can be done on demand from the client. For example, if the client wants the group fingerprints of a previously written backup, it can trigger the formation of the group fingerprints and fetch those same fingerprints to do the GFP-based deduplication.

The advantage with this method is that the backup client can use any existing copy of a previous backup to get the group fingerprints, essentially using any of the previous backup copies as base files to convert the current backup to a synthetic backup. When the original file is deleted, these group fingerprints can also be deleted.

In an embodiment, the GFP auto-generation process performed by the storage server can also be controlled by a policy or attribute set on the file or directory tree (Mtree). Such an attribute can be set at create time and a cron job (or similar mechanism) can be used to asynchronously generate and store these group fingerprints.

Figure 9:
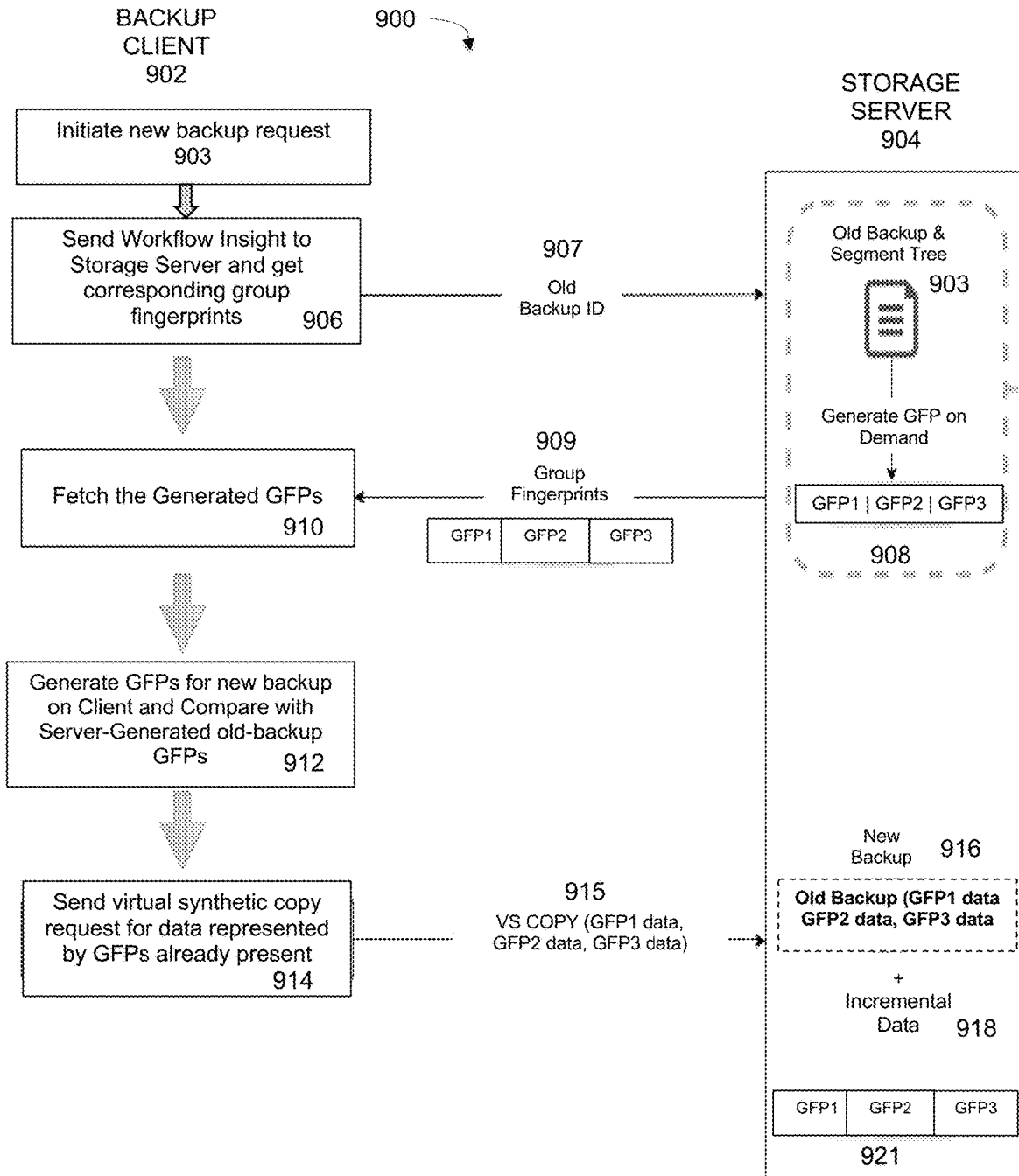
FIG. 9 is a diagram illustrating an overall method and system components for generating group fingerprints on a server for deduplication backups, under some embodiments.

FIG. 9 is a diagram illustrating an overall method and system components for generating group fingerprints on a storage server for deduplication backups, under some embodiments. Diagram 900 illustrates the interaction between a backup client 902 and a storage server 904 to make a synthetic backup of client data using group fingerprints (denoted GFP1, GFP2, GFP3). In this process, upon initiation 903 of a new backup from the backup client 902, the backup client sends a workflow insight in the form of an old backup ID 907 to the storage server 904 to get corresponding group fingerprints for the old backup 909 from the storage server. The storage server 904 processes the old backup ID 907 in process 908 to generate these group fingerprints 909. In an embodiment, process 908 comprises finding the old backup and segment tree 903 from the old backup ID 907, deriving the individual segment fingerprints, and then generating the group fingerprints 909 on demand for return back to the backup client 902.

In process 908, when the storage server 904 receives the workflow insight (e.g., old backup ID) 907 from the backup client 902, it uses this insight to locate the relevant previous backup or backups ("old backup") pertaining and the corresponding fingerprint segment trees 903. The fingerprint segment tree is then scanned to obtain the list of fingerprints 703, as shown in FIG. 7. The group fingerprints 908 are generated on demand and are calculated using a consistent algorithm used by both the backup client 902 and storage server 904.

Once the group fingerprints (GFPs) 909 are generated in the storage server 904, they are fetched 910 by the backup client 902. The backup client compares group fingerprints for the new backup with the group fingerprints from the old backup to determine if any group fingerprints match, 912. If any GFPs match, the backup client then sends a virtual synthetic copy request for data represented by group fingerprints that match (i.e., are already present from the old backup), 914. As shown in FIG. 9, the backup client 902 sends the virtual synthetic (VS) copy 915 for GFP1 data, GFP2 data, and GFP3 data, for example. The storage server 904 then creates a new backup 916 by adding the old backup data for these GFPs with any new incremental data 918. In an embodiment, the data element of [Old Backup (GFP1 data, GFP2 data, GFP3 data)] is referred to as a 'recipe.'

Figure 10:
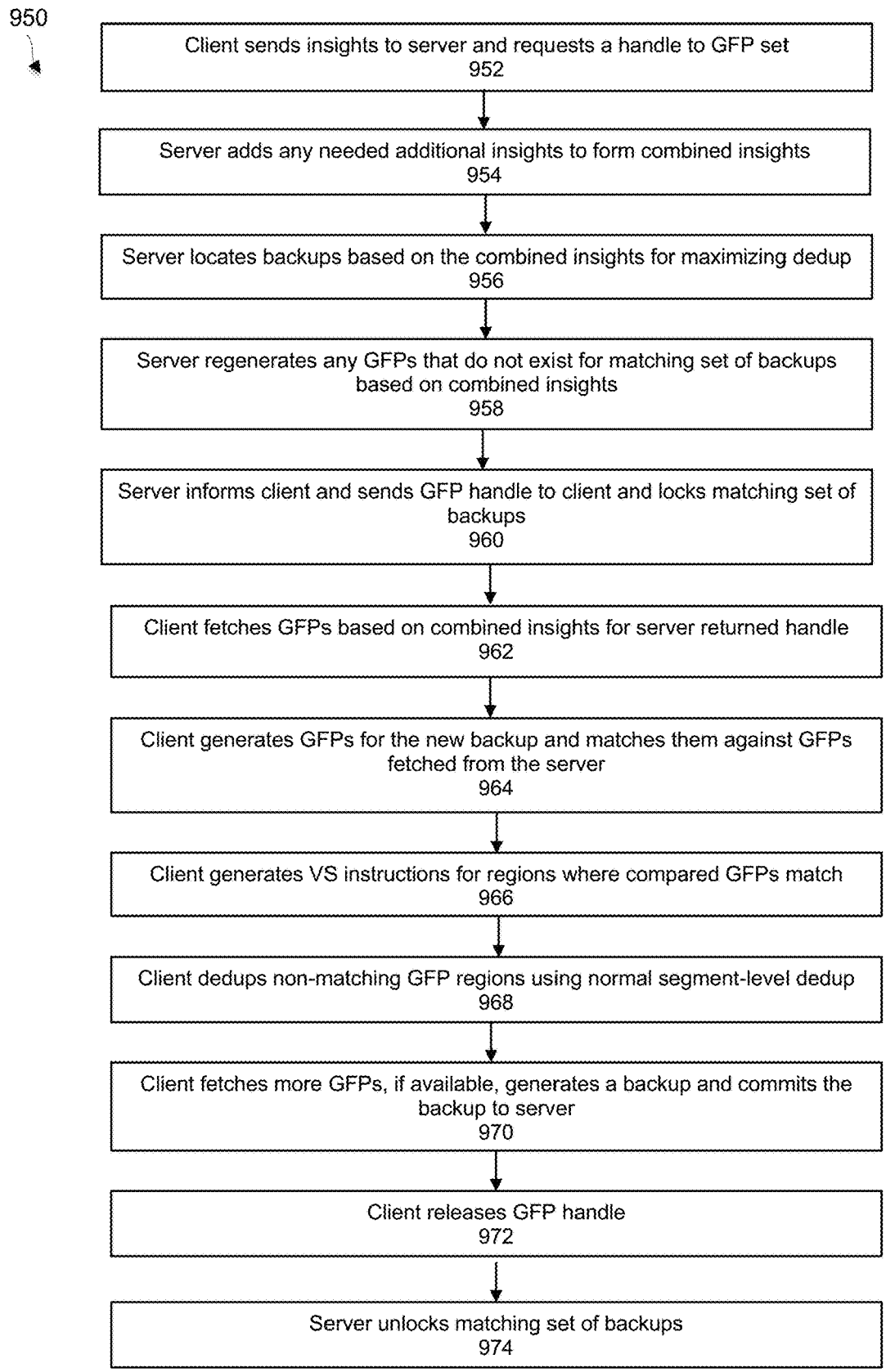
FIG. 10 is a flowchart that illustrates a process of generating group fingerprints on a storage server for deduplication backups, under some embodiments.

FIG. 10 is a flowchart that illustrates a process of generating group fingerprints on a storage server for deduplication backups, under some embodiments. In step 952, the backup client 902 sends insights 907 to the storage server 904 and requests a handle to the GFP set 908. The storage server then adds additional insights so that the client provided insights to form combined insights, 954. The additional insights can be any information not provided by the backup client, but that are deducible by the storage server itself, such as a backup connection from a specific source, a data type, and so on. If the backup client provides sufficient information, there are usually no additional insights required by the storage server, but such additional information may be helpful to narrow down or expand the datasets or files for backup.

The client insights and optional server insights help the storage server locate one or more backups that may contain one or more files, and the server communicates the GFPs for these backups to the backup client. Thus, the storage server next locates a possible set of one or more backups based on the client-sent insight (and any possible additional insights) and gets the group fingerprints for the old backup. These files are likely to be a good fit for the group fingerprint deduplication that maximize the client's ability to perform deduplication through a virtual synthetic backup, 956, and it does this by locating the backup based on the combined insights, and then sending back to the client the GFPs for this located backup. The storage server 904 has the ability to generate GFPs itself at any time. Thus, if any of the client requested GFPs do not exist for one or more of the matching set of backups based on the combined insights, the storage server regenerates them, 958.

After regenerating any necessary GFPs, the storage server directly or indirectly informs the backup client that the GFPs are available and provides the GFP handle to the backup client, 960. In this step, the storage server also locks the matching set of backups so that they cannot be deleted since the backup client may use any of them for the virtual synthetic backup operation.

In step 962, the backup client now begins the deduplication backup operation by first fetching the entire or partial set of GFP from the GFP set that was created based on the combined client and server insights, and for which the handle was returned in step 960. The backup client next generates the GFPs for the new backup and compares them for matches against the GFPs that were fetched from the storage server, 964. The backup client then generates virtual synthetic backup instructions for regions where the compared client-generated GFPs and the fetched GFPs, 966. In the case where there are regions where the generated and fetched GFPs do not match, the backup client deduplicates these non-matching regions using traditional segment-level deduplication, 968.

The backup client then fetches more server-side GFPs if it is running in partial fetch mode, and generates a backup utilizing the virtual synthetic backup instructions, and commits the backup to the storage server, 970.

The backup client next releases the GFP handle so that the storage server is now free to release the GFPs that it had or generated, 972. The storage server also unlocks the matching set of backups and proceeds with normal operations of data deletion, and so on, 974.

In some cases, the backup client may not release the GFP handle (step 972), in which case an auto timeout and cleanup operation may be triggered, so that the system is not left in a stale state. Optionally, the backup client can send the new GFPs for the new backup back to the storage server, and the storage server itself may save them for the new backup. This, however, is not strictly required since the storage server can generate the new GFPs at any time in the future.

The storage server 904 manages the lifetime of the GFPs that are stored on the server for the new backup. It is free to discard them at any time, since it has the ability to generate them again. The storage server also allows the backup client 902 to request a discard of the existing GFPs associated with any backup. The storage server can act on the request and delete or just discard the request.

As compared to the embodiment of FIG. 8, for system 900 of FIG. 9, the storage server can now autogenerate GFPs for any file instead of the client needing to send them over the network. For this embodiment, the backup client can send the GFPs as an optional step, and if they are sent the storage server will use them. If not, the storage server has the capability to autogenerate the GFPs at any time. Any targeted deduplication-capable backup client (i.e., one that can calculate GFPs for new data, do a comparison to identify matches, and issue virtual copy commands) can now utilize the server-resident GFPs for any file to perform targeted deduplication. This enables a backup client to choose what set of GFPs it wants to deduplicate against. The GFPs can be autogenerated for any of the files resident on the storage server, such as NFS ingested or older backups, or backups done using a non-targeted, deduplication-capable client. Additionally, the GFPs can be autogenerated on-demand or during the storage server idle time.

Generating the group fingerprints on the storage server has certain advantages over having them pushed by the backup client to the storage server. First, it eliminates the need to send the group fingerprints from client to server. Since the storage server has the capability to autogenerate the GFPs by scanning the files present on the storage server, the operation of a backup client sending the newly calculated GFPs to the storage server can now be considered optional. If the new GFPs are sent, the storage server will store them. Otherwise, the GFPs can be generated on demand at any time.

Second, it removes the need to always persist the group fingerprints for many backups, thus saving storage space. Since the storage server now can generate the GFPs by itself at any time, this eliminates the need for always persisting these GFPs on the storage server.

Third, the system can generate group fingerprints for any file present on the storage server and use it as a base file for synthetic backups. The backup client can use the GFPs from any file present on the storage server for targeted deduplication. The backup client can choose to ask for GFPs of a specific file, which can then be generated on demand on the storage server. They can then be sent to the client, which can use them for deduplication using the same GFP deduplication process as described above.

Fourth, any backup, such as from a non-GFP-aware client using NFS/traditional Boost client-side deduplication, can now be switched to a virtual synthetic-style backup on the Data Domain Restorer (DDR) side, as opposed to deduplication by L0 style filtering, thus potentially reducing fingerprint metadata. Clients that are not capable of executing client-side deduplication will still send the data fully to the storage server (in case of NFS), or the full data in segment and fingerprint format (in the case of traditional DDBoost deduplication). In both of these cases, if the GFPs for older backups are already present on the storage server, the storage server can now start doing GFP based deduplication and convert the new backups into virtual synthetic backups. In this process, the storage server will calculate the group fingerprints for the newly ingested data and compare them with group fingerprints already existing on the storage server. If the storage server was to do a traditional deduplication using L0 filtering, it would not get this benefit. If the system uses the GFPs, it will be able to deduplicate data at a much coarser level by doing virtual synthetic copies of matching data between the new backup and older backups. Converting the backups to virtual synthetic style backups will also reduce the footprint of the fingerprint metadata that needs to be stored for the new backup, since it now store recipes instead of all the L0/LP metadata.

Fifth, any backup client that has GFP capability can leverage GFPs calculated on the deduplication backup system. When GFPs are present on the storage server and a GFP-enabled backup client finds that the storage server has the GFPs, it can then query the GFPs as needed to perform GFP based deduplication. This allows any future GFP enabled backup clients to benefit from autogenerating GFPs on the storage server.

Embodiments of the processes and techniques described above can be implemented on any appropriate backup system operating environment or file system, or network server system. Such embodiments may include other or alternative data structures or definitions as needed or appropriate.

Figure 11:
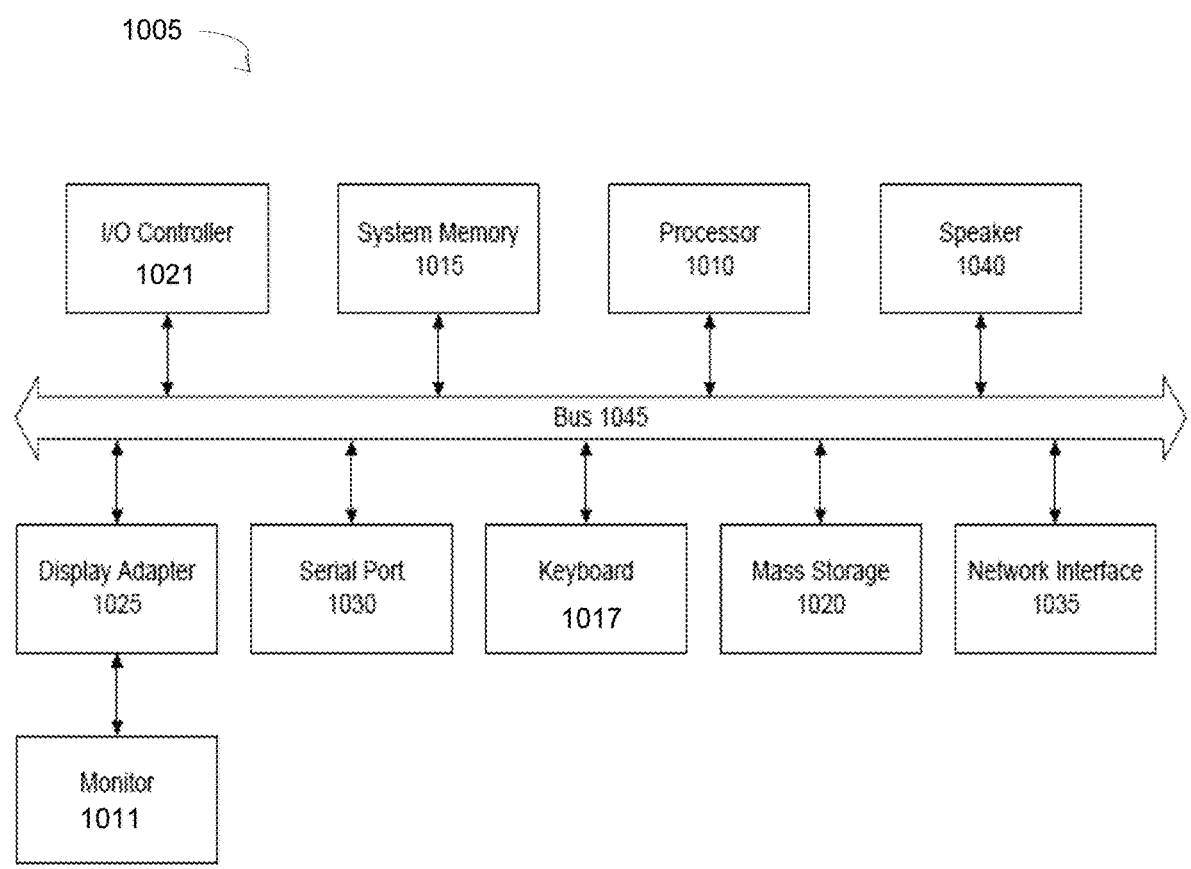
FIG. 11 is a system block diagram of a computer system used to execute one or more software components of described processing operations, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 11 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system 1005 may be one of the Microsoft Windows®, family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of making virtual synthetic backups of protected data from a backup client for storage in a storage server of a deduplicated backup system, comprising:
   sending, from the backup client to the storage server, an insight about an old backup for use in deduplicating a new backup and a request for a group fingerprint set;
   first generating, using the insight on the storage server, group fingerprints for the old backup;
   fetching the group fingerprints from the storage server to the backup client;
   second generating, on the backup client, group fingerprints of the new backup;
   comparing, on the backup client, the new backup group fingerprints to the old backup group fingerprints;
   sending, for any matching group fingerprints in the comparing step, from the backup client to the storage server, a virtual synthetic copy request; and
   creating the new backup in response to the virtual synthetic copy request, and wherein the deduplicated backup system comprises a Data Domain file system (DDFS) and a Data Domain Bandwidth Optimized Open Storage Technology (DDBoost) library that links with the application to reduce bandwidth required for data ingests, and which translates application read and write request to DDBoost application program interfaces (APIs).

2. The method of claim 1 wherein protected data comprises a plurality of data segments, and the group fingerprints comprise a set of fingerprints, and wherein each fingerprint comprising a signature for a respective data segment of the plurality of data segments.

3. The method of claim 2 wherein the signature for each respective data segment is generated using a cryptographic hash function, and wherein the fingerprints are stored in a L0 to L6 layered directory tree.

4. The method of claim 2 wherein the fingerprints of each group fingerprints are grouped using a defined grouping algorithm, and wherein the insight comprises at least one of: a backup identifier, a filename and path of the previous backup, or other identifying information about the previous backup.

5. The method of claim 1 further comprising, if there is no match in the comparing step, copying data for the group fingerprints of the new backup from the backup client to the storage server, performing using per-segment deduplication in the backup client.

6. The method of claim 5 wherein the backup identifier comprises at least one of: a job number, backup location information, a filename and path of a previous backup, or other identifying information about one or more previous backups.

7. The method of claim 1 wherein each of the first generating step and second generating step further comprises:
dividing the backup data into variable size segments;
generating a fingerprint for each segment;
combining generated fingerprints to form the group fingerprints; and
storing the group fingerprints, segments, and fingerprints in one of the storage server and the backup client.

8. The method of claim 1 wherein the matching group fingerprints and the insight enable virtual synthetic backups for an application that does not have sufficient knowledge of change data blocks from the previous backup to use virtual synthetic backup operations by itself.

9. The method of claim 1 further comprising:
adding, in the storage server, additional insights comprising information not provided but deducible by the storage server, to the client-sent insights to form combined insights; and
re-generating, in the storage server any group fingerprints that do not exist for matching backups based on the combined insights.

10. The method of claim 9 further comprising, after the step of creating the new backup in response to the virtual synthetic copy request, releasing by the backup client, the requested group fingerprint handle, and unlocking, by the storage server, the matching backups.

11. A computer-implemented method of making virtual synthetic backups of protected data from a backup client for storage in a storage server of a deduplicated backup system, comprising a server-side process of:
receiving, from the backup client to the storage server, an insight about an old backup and a request for a group fingerprint set;
adding, in the storage server, an additional insight to the insight received from the backup client to form combined insights;
locating, in the storage server, backups that maximize client-side deduplication for virtual synthetic backups;
re-generating, in the storage server, any group fingerprints that do not exist for a matching set of backups based on the combined insights;
sending, from the storage server to the backup client, a handle for the re-generated group fingerprints;
locking the matching set of backups in the storage server, and further comprising a client-side process of:
sending the insight request for a group fingerprint set to the storage server;
fetching, in the backup client in response to the handle sent from the storage server, group fingerprints comprising the generated and re-generated group fingerprints;
generating, in the backup client, new backup group fingerprints;
comparing the new backup group fingerprints to the group fingerprints fetched from the storage server to find any matching group fingerprints;
generating virtual synthetic copy instructions for data corresponding to any matching group fingerprints;
performing, on the backup client, segment-level deduplication for data corresponding to any non-matching group fingerprints;
generating, from the backup client, a backup operation that uses the virtual synthetic copy instructions;
committing the backup operation to the storage server; and
releasing, by the backup client, the group fingerprint handle allowing the storage server to release the group fingerprints generated by the storage server.

12. The method of claim 11 further comprising unlocking, by the storage server, the backups corresponding to the released group fingerprints.

13. The method of claim 11 wherein the fingerprints of each group fingerprints are grouped using a defined grouping algorithm, and wherein the insight comprises at least one of: a backup identifier, a filename and path of the previous backup, or other identifying information about the previous backup.

14. The method of claim 12 wherein the additional insight comprises any information not provided by the backup client, but that can be deduced by the storage server itself.

15. A computer-implemented method of making virtual synthetic backups of protected data from a backup client for storage in a storage server of a deduplicated backup system, comprising a client-side process of:
sending, from the backup client to the storage server, an insight about an old backup and a request for a group fingerprint set;
fetching, in the backup client in response to a handle sent from the storage server, group fingerprints comprising the generated and re-generated group fingerprints;
generating, in the backup client, new backup group fingerprints;
comparing the new backup group fingerprints to the group fingerprints fetched from the storage server to find any matching group fingerprints;
generating virtual synthetic copy instructions for data corresponding to any matching group fingerprints; and
performing, on the backup client, segment-level deduplication for data corresponding to any non-matching group fingerprints, and wherein the deduplicated backup system comprises a Data Domain file system (DDFS) and a Data Domain Bandwidth Optimized Open Storage Technology (DDBoost) library that links with the application to reduce bandwidth required for data ingests, and which translates application read and write request to DDBoost application program interfaces (APIs).

16. A method of claim 15 further comprising a server-side process of:
adding, in the storage server, an additional insight to the insight received from the backup client to form combined insights;
locating, in the storage server, backups that maximize client-side deduplication for virtual synthetic backups;
re-generating, in the storage server, any group fingerprints that do not exist for a matching set of backups based on the combined insights;
sending, from the storage server to the backup client, a handle for the re-generated group fingerprints; and
locking the matching set of backups in the storage server.

* * * * *